(12) United States Patent
Baker et al.

(10) Patent No.: US 7,641,288 B1
(45) Date of Patent: Jan. 5, 2010

(54) OMNI-DIRECTIONAL WHEEL DESIGN FOR CONSTRUCTION COST REDUCTION

(76) Inventors: Andrew R. Baker, 5959 W. 00NS, Kokomo, IN (US) 46901; Mark A. Koors, 3607 Lyons Dr., Kokomo, IN (US) 46902

(*) Notice: Subject to any disclaimer, the term of this patent is extended or adjusted under 35 U.S.C. 154(b) by 0 days.

(21) Appl. No.: 12/317,566

(22) Filed: Dec. 22, 2008

(51) Int. Cl.
*B60B 19/00* (2006.01)
(52) U.S. Cl. .......................... 301/5.23; 16/45
(58) Field of Classification Search .............. 301/5.1, 301/5.23; 16/18 R, 45–47
See application file for complete search history.

(56) References Cited

U.S. PATENT DOCUMENTS

| 3,746,112 | A | 7/1973 | Ilon |
| 3,789,947 | A | 3/1975 | Blumrich |
| 3,876,255 | A | 4/1975 | Ilom |
| 4,223,753 | A | 9/1980 | Bradbury |
| 4,715,460 | A | 12/1987 | Smith |
| 4,823,900 | A | 4/1989 | Farnum |
| 4,926,952 | A | 5/1990 | Farnum |
| 5,312,165 | A * | 5/1994 | Spletter ................. 301/5.23 |
| 5,323,867 | A | 6/1994 | Griffen et al. |
| 5,551,349 | A * | 9/1996 | Bodzin ................. 301/5.23 |
| 5,720,529 | A | 2/1998 | Barron |
| 6,340,065 | B1 | 1/2002 | Harris |
| 6,394,203 | B1 | 5/2002 | Harris |
| 6,431,664 | B1 * | 8/2002 | Sawada ................ 301/5.23 |
| 6,547,339 | B2 | 4/2003 | Bandou |
| 6,547,340 | B2 | 4/2003 | Harris |
| 6,757,936 | B2 * | 7/2004 | Yamaguchi et al. ........... 16/47 |
| 6,796,618 | B2 | 9/2004 | Harris |
| 6,857,707 | B2 | 2/2005 | Guile |
| 2008/0018166 | A1 * | 1/2008 | Chang ................. 301/5.23 |

* cited by examiner

*Primary Examiner*—Jason R Bellinger
(74) *Attorney, Agent, or Firm*—Frank D. Lachenmaier

(57) ABSTRACT

This invention relates generally to an apparatus design that minimizes fabrication and assembly costs for an omni-directional wheel.

3 Claims, 4 Drawing Sheets

OMNI-DIRECTIONAL WHEEL DESIGN FOR CONSTRUCTION COST REDUCTION

BACKGROUND

1. Field of Invention

Figure 1:
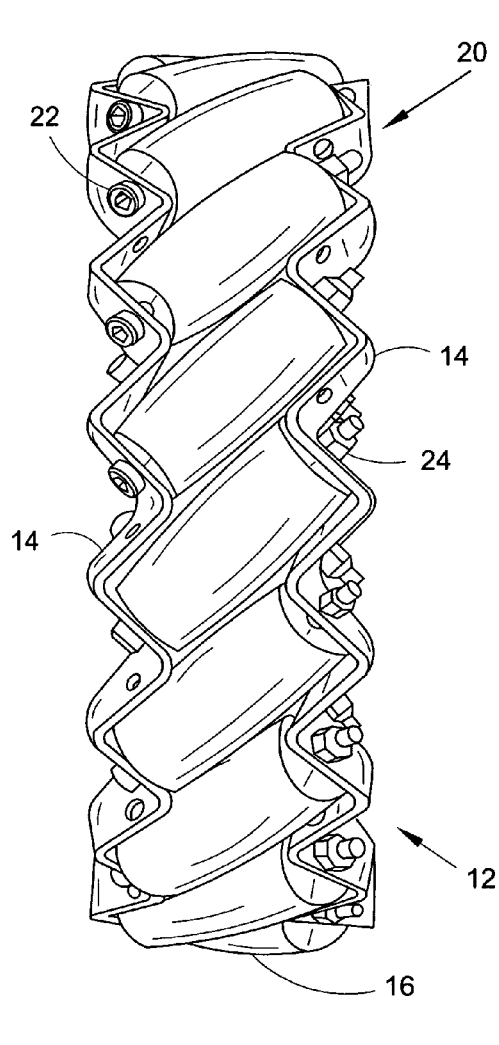

This invention relates generally to an apparatus design that minimizes fabrication and assembly costs for an omni-directional wheel. More specifically it refers to the design of the wheel and the roller mounting. The unique design allows the use of two identical stampings or molded bases with key holes and locating posts diametrically opposed, assembled back to back with elastomeric or rubber outer rollers mounted in between at an angle to the axis of rotation. The unique stamped or molded bases are so aligned as to allow the rollers to be assembled in either a right handed or left handed wheel orientation for either right or left wheels on a self propelled platform. This unique design allows for assembly with a minimum number of separate parts with commensurate minimized tooling costs which then allows for the use of omni-directional wheels in many applications that were heretofore cost prohibitive.

2. Prior Art

U.S. Pat. No. 3,746,112 Ilon 1973 through U.S. Pat. No. 6,857,707 Guile 2005 show various complex and expensive variations of the original Ilon concept known as a Mecanum Wheel. Four of these wheels mounted on the corners of a robot and independently driven cause the robot to move in a controlled omni-directional fashion. Harris patents U.S. Pat. No. 6,394,203 B1 2002, 6,340,065 B1 2002, 6,547,340 B2 2003 and 6,796,618 B2 2004, focused on the design of the outside rollers in an attempt to promote a vibration free ride under various load conditions.

SUMMARY OF INVENTION

An object of the present invention is to provide an inexpensive omni-directional wheel that when mounted on the four corners of a frame and independently driven allow for omni-directional movement of the mounting frame.

A further object of the present invention is to provide an omni-directional wheel and a fabrication method and assembly process that minimizes the number of separate parts to tool, maintain in inventory and simplifies the assembly of same.

The present invention, in its several embodiments, meets the above mentioned objectives.

Still further objects and advantages will become apparent from a consideration of the ensuing description and accompanying drawings. In the description, reference is made to the accompanying drawings which form a part thereof, and in which are shown, by way of illustration, the left and right side embodiments in which the invention may be practiced. These embodiments will be described in sufficient detail to enable those skilled in the art to practice this invention, and be understood that other embodiments may be utilized and that structural changes, wheel diameters and number of rollers may be made without departing from the scope of the invention. In the accompanying drawings, like reference characters designate the same or similar parts throughout the several views.

DRAWINGS

Figure 2:
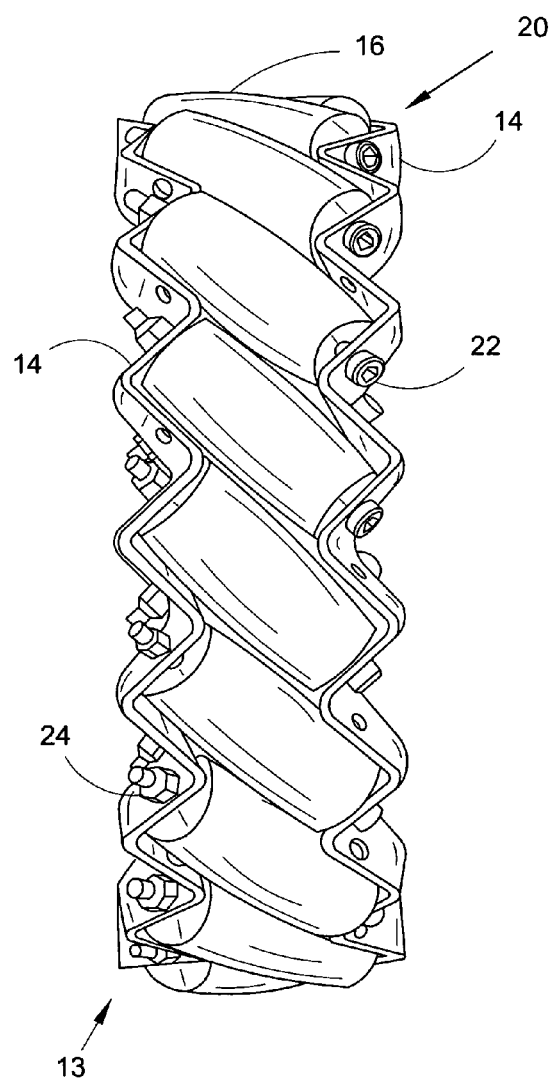
Figure 3:
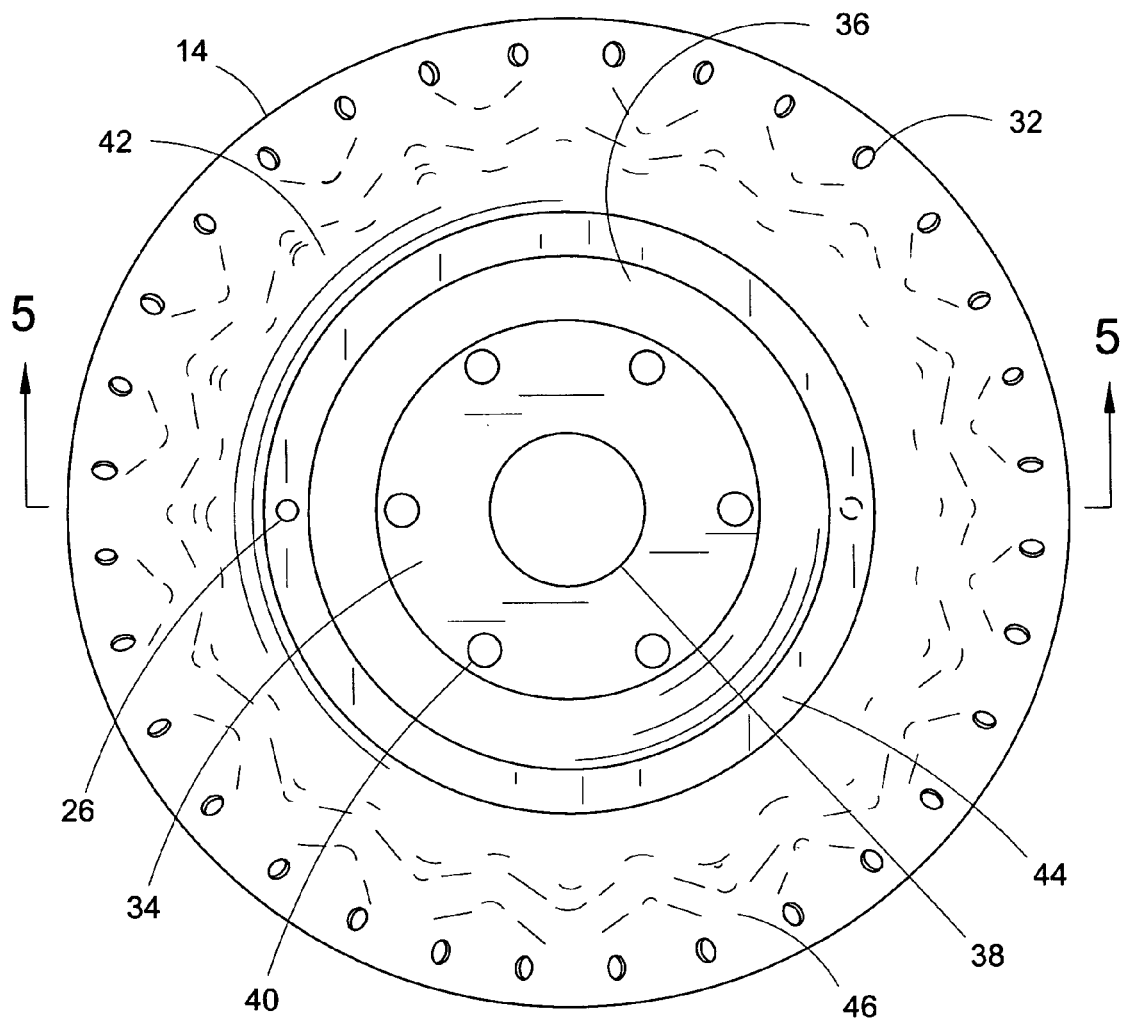
Figure 4:
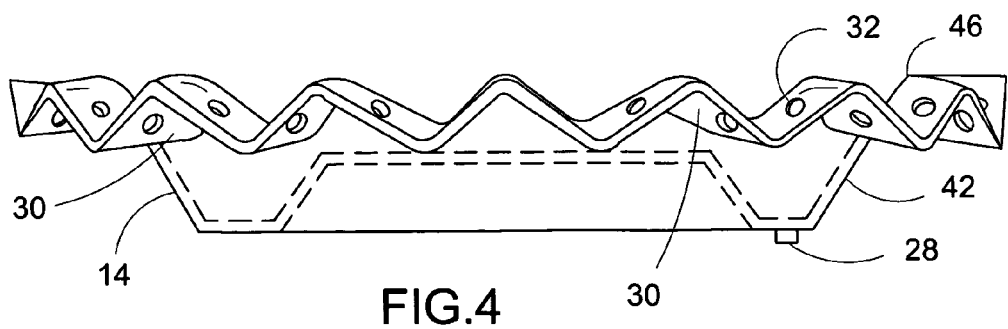
Figure 5:
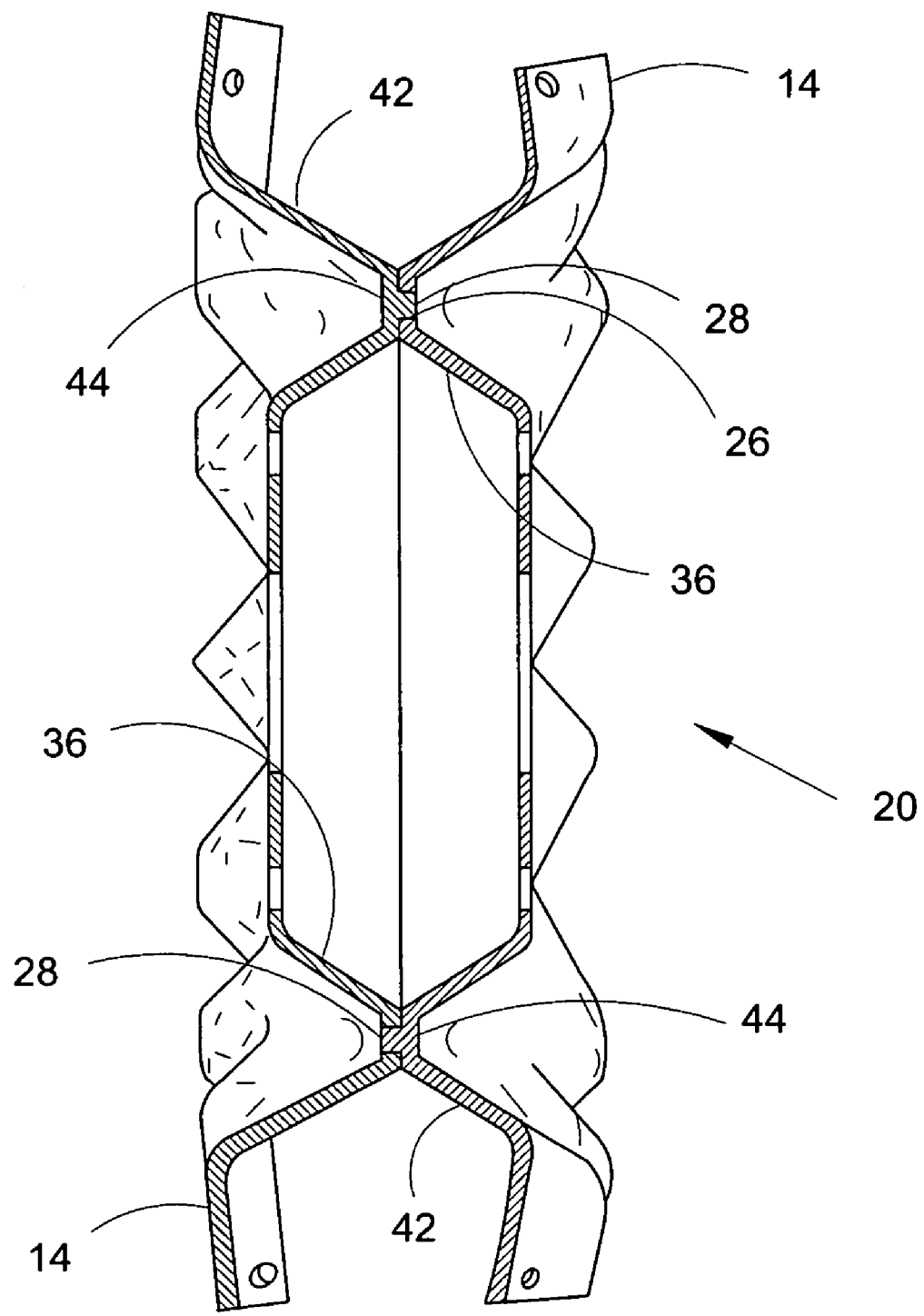
Figure 6:
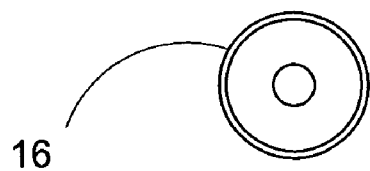
Figure 8:
Figure 7:
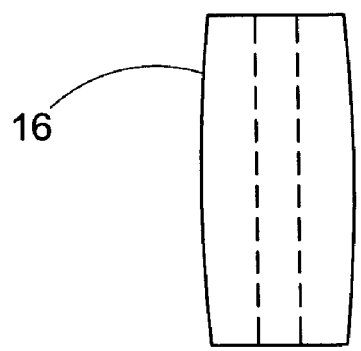
Figure 9:
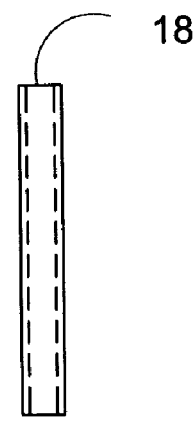

In order that the invention may be more fully understood it will now be described by way of example, with reference to the accompanying exemplary drawings in which:

FIG. 1 is a rear view of the right hand omni-directional wheel assembly;
FIG. 2 is a rear view of the left hand omni-directional wheel assembly;
FIG. 3 is a side view of a side plate;
FIG. 4 is a bottom view of a side plate;
FIG. 5 is a section view of two side plates assembled taken along section lines 5-5 in FIG. 3.
FIG. 6 is an end view of a roller;
FIG. 7 is a side view of a roller;
FIG. 8 is an end view of a bearing; and
FIG. 9 is a side view of a bearing

REFERENCE NUMERALS

The same reference numbers are used to refer to the same or similar parts in the various views.

DETAILED DESCRIPTION

A preferred embodiment of a six inch diameter omni-directional right wheel assembly 12 and an embodiment of left wheel assembly 13 will now be described, by way of examples, with reference to the accompanying FIGS. 1 through 9.

It will be understood that omni-directional wheel assemblies 12 and 13 are intended to solve the problems of high fabrication and assembly costs of previously available omni-directional wheels that have precluded their applications on personal transportation systems such as wheel chairs. Both right and left handed wheels assemblies 12 and 13 can be assembled from the same set of parts as shown in FIGS. 1 and 2 respectively.

Omni-directional wheel assemblies 12 and 13 each include side plate assembly 20 comprised of two side plates 14 attached back to back as shown in FIG. 5. The key to the low cost structure disclosed in this invention is embodied in the design of side plates 14. Side plates 14 are shown in side view in FIG. 3 and in bottom view in FIG. 4. Side plate 14 consists of center hub 34 with axle clearing center bore 38 and six clearance holes 40 for mounting studs on axle, axle and mounting studs not part of this invention. Center hub 34 is connected to interior wall 36 which tapers backward and outward to the inside diameter of annular ring 44 which is on a plane rearward of and parallel to the plane of center hub 34. Annular ring 44 contains keying hole 26 and keying stud 28, diametrically opposed from each other and centered between the inside and outside diameters of annular ring 44. Keying stud 28 extends approximately 2 material thicknesses behind backside of annular ring 44. The outside diameter of annular ring 44 connects to exterior wall 42 which extends above the plane of center hub 34 and connects to a series of flats 30 at right angles to each other with the tops of flats 30 at flat apex 46 and the bottom of flats 30 is on the same plane as center hub 34. Flats 30 extend outward from exterior wall 42 to the perimeter of side plate 14. A six inch diameter wheel requires 32 equal length flats 30 distributed around perimeter of side plate 14 at approximately 11.25 degree increments. Flats 30 can be used either as base or cap flats 30 as shown in FIG. 4 for either right hand or left hand wheel assemblies 12 and 13 respectively. Side plates 14 are preferably stampings made from 0.040 Inch thick cold rolled steel but could be cast or molded as well. Side plates 14 are shown in a side view and a bottom view in FIGS. 3 and 4 respectively. For a six inch diameter wheel, sixteen rollers 16 are assembled on anti-friction bearings 18 and slipped between sixteen flats 30 on the outside side plate 14 and sixteen opposing flats 30 on the inside side plate 14 as shown in FIGS. 1 and 2. They are rotatably coupled between attached side plates 14, preferably by sixteen M3×05×45 mm socket head cap screws 22 and held in adjustable tension preferably by 16 M3×0.5 locking nut 24 fasteners. Two side plates are placed back to back and rotated until key studs 28 drop into mating key holes 26 which aligns flats 30 on inner side plate 14 and flats 30 on outer side plate 14. The two plates are then securely attached forming side plate assembly 20, preferably by spot welding, and then zinc plated. As illustrated in FIGS. 1 and 2, rollers 16 can be placed in either the right hand or left hand sets of flats 30 producing either right or left omni-directional wheel assemblies 12 or 13.

Rollers 16 are assembled on anti-friction bearings 18, preferably a 1.5 inch long×0.188 inch diameter brass tube, and are held in-between a flat 30 on the outside side plate and a flat 30 on the inside side plate. Sixteen rollers 16 are rotatably coupled to side plate assembly 20 by sixteen socket head cap screws 22 inserted through mounting holes 32 in flats 30 of outer side plate 14; screw 22 is slipped through bearing 18 that has been inserted into roller 16; the distal end of screw 22 is inserted through mounting hole 32 in opposing flat 30 on inside plate 14; the freedom of roller 16 to rotate is adjusted by tightening locking nut 24 on the distal end of screw 22

Rollers 16 are preferably molded from a non-marking black rubber of approximately 80 A durometer. These rollers have a curved outer surface such that when placed in the wheel assembly at the proper angle of canting they present a circular apex allowing a vibration free rotation of said wheel assembly. A 6 inch outside diameter omni-directional wheel assembly 12 or 13 requires sixteen 1.5 inch long rollers with a 4.718 inch arc starting at 0.6 inch diameter at each end and increasing to approximately 0.72 inch diameter at the midpoint of roller 16. The core of roller 16 has an approximately 0.188 inch diameter bore for clearance for a 0.188 inch diameter×1.5 inch long brass bearing.

While this invention has been described with reference to these illustrative embodiments, it will be understood that this description is not limiting as to size, scale or construction materials. Rather, the scope of this invention is defined by the following claims.

What is claimed is:

1. An omni-directional right or left wheel for a self-propelled vehicle comprising:
    two opposing side plates each with a circular perimeter, a front surface with an inside diameter and an outside diameter, a back surface with an inside diameter and an outside diameter,
    said center hub with a center bore, a plurality of clearance holes disposed radially toward said outside diameter of said center hub,
    where said center hub is disposed axially between said front surface and said back surface,
    where said center hub is connected to said back surface by said interior wall that connects axially rearward and radially outward from said outside diameter of said center hub to said inside diameter of said back surface,
    where said front surface is connected to said outside diameter of said back surface by said exterior wall that connects axially rearward and radially inward from said inside diameter of said front surface to said outer diameter of said back surface,
    said inside diameter and said outside diameter of back surface form an annular ring wherein a keying stud extends axially rearward from said annular ring with said keying stud being radially centered in said annular ring, a matching keying hole is diametrically opposed to said keying stud, centered between said inside and outside diameters of said annular ring, said front surface is comprised of a plurality of sets of two flats at right angles to each other that rise and fall at a 45 degree angle to the axis of rotation and are canted to a predetermined angle axially,
    said flats with a mounting hole centered in said flat,
    a plurality of free spinning rollers with bearing clearance center bores to match the number of said sets of two flats wherein the quantity of said rollers, the diameter of said side plates and the taper from end to center of said rollers is such that when said rollers are mounted between said flats on said opposing side plates, the view taken along said axis of rotation of said omni-directional wheel shows the perimeter to be a continuous circle;
    a matching plurality of brass bearings inserted into said clearance bores in said rollers;
    a matching plurality of screws inserted though said clearance holes in said flats, through said bearings in said rollers and out through said clearance holes in said flats; and retained by
    a matching plurality of locking nuts, whereby tightening or loosening said locking nuts adjusts the rolling freedom of said rollers.

2. An omni-directional wheel for a self-propelled vehicle as in claim 1 wherein the angle that said flats are canted is an angle chosen from the group of 30, 45, 60 and 90 degrees from said axis of rotation.

3. An omni-directional wheel for a self-propelled vehicle as in claim 1 wherein said roller is made from an 80 A durometer black non-marking rubber material.

* * * * *